US008264344B2

United States Patent
Lee et al.

(10) Patent No.: US 8,264,344 B2
(45) Date of Patent: Sep. 11, 2012

(54) REMOTE SURVEILLANCE AND INTERVENTION USING WIRELESS PHONE

(75) Inventors: Shze Chew Lee, Irvine, CA (US); Andrew M. Gutman, Foothill Ranch, CA (US)

(73) Assignee: Cisco Technology, Inc., San Jose, CA (US)

( * ) Notice: Subject to any disclaimer, the term of this patent is extended or adjusted under 35 U.S.C. 154(b) by 1955 days.

(21) Appl. No.: 11/369,798

(22) Filed: Mar. 6, 2006

(65) Prior Publication Data

US 2007/0205888 A1 Sep. 6, 2007

(51) Int. Cl.
*G08B 1/08* (2006.01)
*H04Q 1/30* (2006.01)
(52) U.S. Cl. ......... 340/539.26; 340/539.25; 340/539.14; 340/531
(58) Field of Classification Search ............. 340/539.26, 340/539.25, 539.14
See application file for complete search history.

(56) References Cited

U.S. PATENT DOCUMENTS

| 6,060,994 A | 5/2000 | Chen |
| 6,163,257 A | 12/2000 | Tracy |
| 6,271,752 B1 | 8/2001 | Vaios |
| 2004/0205825 A1 | 10/2004 | Kawabe et al. |
| 2005/0278767 A1 | 12/2005 | Ahluwalia |

FOREIGN PATENT DOCUMENTS

| DE | 100 46 542 | 3/2002 |
| EP | 1 408 657 | 4/2004 |
| WO | WO 2005/116947 | 12/2005 |

*Primary Examiner* — Donnie Crosland
(74) *Attorney, Agent, or Firm* — Haynes and Boone, LLP

(57) ABSTRACT

A mobile surveillance appliance receives sensed data over a wireless link from a remote sensing post which monitors a remotely monitored space having a predefined spatial location and transmits the sensed data. The mobile surveillance appliance provides a display of the sensed data from monitored space and an intervention controller which, when activated responsive to an event perceived on the display, encodes the predefined spatial location and an event melioration onto a remote intervention request, and transmits the intervention request to a remote intervener. The remote sensing post, mobile surveillance appliance, and remote intervener may communicate using SIP messaging.

24 Claims, 3 Drawing Sheets

300

305 — INVITE sip:RA350@intervenors.com SIP/2.0
Via: SIP/2.0/UDP pc33.irvine.com;branch=z9hG4bK776asdhds
310 — Max-Forwards: 70
315 — To: Bob A. <sip:RA350@intervenors.com>
From: Ted E. <sip:tede@irvine.com>;tag=1928301774
325 — Call-ID: a84b4c76e66710@pc33.irvine.com
CSeq: 314159 INVITE
Contact: <sip:tede@pc33.irvine.com>
Content-Type: application/xx
Content-Length: nnn

355 — INVITE sip:RA350@intervenors.com SIP/2.0
Via: SIP/2.0/UDP pc33.irvine.com;branch=z9hG4bK776asdhds
360 — Max-Forwards: 70
To: Bob A<sip:RA350@intervenors.com>
365 — From: Ted E <sip:tede@irvine.com>;tag=1928301774
375 — Call-ID: DX2FO3mm9G9AG6@pc33.irvine.com
CSeq: 314159 INVITE
Contact: <sip:tede@pc33.irvine.com>
Content-Type: application/xx
Content-Length: nnn

FIG. 3B

… (US 8,264,344 B2, col. 1–2)

REMOTE SURVEILLANCE AND INTERVENTION USING WIRELESS PHONE

TECHNICAL FIELD

The present invention pertains to remote surveillance and intervention, more particularly, remote surveillance and intervention using a mobile handheld device.

BACKGROUND

A mobile user may have a desire to easily and, perhaps, unobtrusively surveil or monitor a remote location for the occurrence of a condition or event ("event"). The mobile user may have a concomitant desire to seek advice, or to request third-party intervention with the remote location event. Currently, remote surveillance and monitoring activities ("surveillance") are undertaken by a third-party agent on behalf of a user, a business, and the like, typically under a for-fee service agreement. A service agreement also may specify control or intervention ("intervention") activities to be undertaken by the agent on behalf of the mobile user. Under such an arrangement, the third-party agent performs surveillance and intervention ("S&I") functions substantially autonomously from the mobile user contracting for these services, tending to narrow the scope of intervention functions that may be undertaken. Typically, the third-party agent, after a delay, notifies the mobile user of an observed event, or of an intervention action taken in response to the agent's observation. The mobile user may have no opportunity to interact with, or to direct, remote interveners as the event evolves. As is typical of current for-fee S&I service agreements, the surveillance assets are specified and deployed under the exclusive control of the third-party agent. Also, the provisions of many S&I agreements are defined by inclusion, that is, only those services, which are specified in the S&I service agreement are available to the mobile user. Examples include the scope of S&I services provided, the number of employees engaged and assigned, the communication and notification infrastructure and protocols used, and the surveillance assets deployed and installed. An incremental expansion of S&I services can be obtained, if at all, at an additional cost to the mobile user.

Conventional third-party S&I installations and services may be expensive or may lack the flexibility or intervention characteristics desired by a mobile user who desires, for example, occasional, event-driven, or multiple-site surveillance and intervention services. Indeed, the sheer number of potentially monitored locations, and the range of events suitable for ad hoc intervention, can be staggering. In a great number of instances, a mobile user wants the ability to make first-hand observations, to decide what action, if any, ought to be taken for a given event, and to select which response may be most desirable, given the nature of what is observed. In many cases, the mobile user may prefer to perform ad-hoc remote surveillance personally, without the burden or expense of a commercial third-party vendor, and to initiate and direct requests for intervention, with remotely positioned friends, family, employees, contractors, agents, fire safety personnel, or law enforcement, acting as remote interveners.

Accordingly, there is a need for mobile communications appliances and methods that satisfy the need for versatile, low-cost surveillance and intervention implementations that offer the mobile user the capabilities of remote location surveillance and, when desired, of remote event intervention.

BRIEF DESCRIPTION OF DRAWINGS

FIG. 3A is a depiction of an exemplary unmodified, application-layer, text-based messaging header, as may be communicated by a mobile surveillance appliance used in the surveillance systems in FIG. 1 and in FIG. 2, in accordance with selected embodiments of the present invention; and FIG. 3B is a depiction of an exemplary modified, application-layer, text-based messaging header, as may be communicated by mobile surveillance appliance used in the surveillance systems in FIG. 1 and FIG. 2, in accordance with other selected embodiments of the present invention.

DETAILED DESCRIPTION

Figure 1:
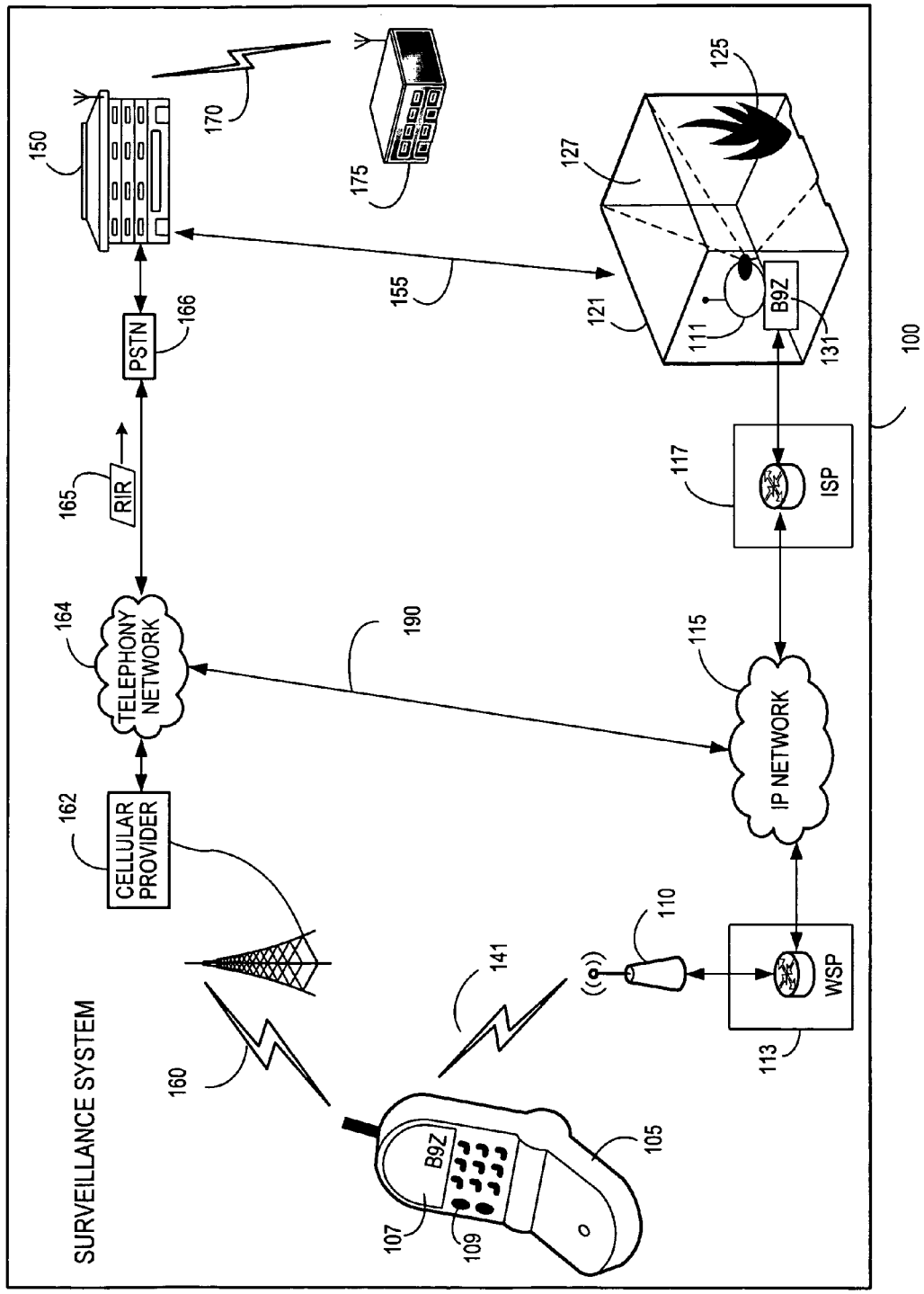
FIG. 1 is a simplified illustration of an exemplary embodiment of a surveillance system, according to the present invention.

Embodiments of the present invention provide a mobile surveillance system, a mobile surveillance appliance, and a mobile surveillance method that can enable a mobile user to monitor a remote location and to effect a remote intervention for a perceived event at the remote location. A mobile surveillance appliance can receive sensed data over a first wireless link from a remote sensing post, which monitors a predefined remotely monitored space having a predefined spatial location. The predefined remotely monitored space is associated with a predefined spatial location. The first wireless link can be coupled to a fixed wireless network access point, which itself is coupled to a packetized data network. The remote sensing post can be identified by a unique spatial identifier corresponding to the predefined spatial location, and may encode the unique spatial identifier onto the sensed data to provide spatial identification of the sensed data source. The unique spatial identifier may include spatial and non-spatial descriptive attributes corresponding, for example, to the mobile user, to the predefined remotely monitored space, to the event perceived by the mobile user, to a remote intervention, or to a remote intervener. A unique locator code may be a compact token, corresponding to the unique spatial identifier. The mobile surveillance appliance may store, in memory, remotely monitored space data, corresponding to at least one of the predefined spatial location, a spatial descriptive attribute, and a non-spatial descriptive attribute, or of a unique locator code corresponding thereto. The mobile surveillance appliance can transform the sensed data into a representation of the predefined remotely monitored space that is perceivable by the mobile user, thereby permitting the mobile user to surveil the remotely monitored space. The remote sensing post may be capable of remote activation and control by the mobile user, and may transmit a notification to the mobile surveillance appliance upon the occurrence of a predetermined sensed condition, which may indicate the occurrence of an event. The remote sensing post may detect plural physical dimensions, including without limitation, image, sound, motion, heat, atmospheric or seismic disturbances, and any combination thereof. The mobile user may effect a remote intervention, responsive to the predetermined sensed condition, or the event perceived, in the predefined remotely monitored space, by transmitting a remote intervention request to a remote intervener over a second wireless link. The second wireless link may be coupled to a mobile wireless network access point and to a telephony network. The second wireless link also may be coupled to a packetized data network, so that the remote intervention request also may be transmitted over a portion of the packetized data network. The mobile surveillance appliance may include an intervention controller capable of causing the mobile surveillance appliance to form remote intervention request and to transmit the remote intervention request to a remote agent over the second wireless link. The intervention controller also may cause the mobile surveillance appliance to encode the unique spatial identifier, or the unique locator code, onto the remote intervention request, before transmission to the remote intervener. The remote intervener may be a remote agent that directly undertakes on behalf of the mobile user, an event melioration corresponding with the remote intervention request. The remote intervener may be a remote human intervener, a remote automated intervener, or a combination thereof. The mobile user may use the mobile surveillance appliance to perceive the remote event, and to direct a remote automated intervener to undertake a melioration of the event.

Conveniently, the mobile surveillance appliance may be implemented using relatively inexpensive, commercially available mobile communications appliances that are adapted and configured to communicate using a mobile wireless networking mode and a fixed wireless networking mode. Mobile wireless networks typically provide telephony services; fixed wireless networks typically provide packetized data network services, including Internet services. Entities and protocols employed by the respective wireless modes are generally adapted to communicate with fixed-link entities and protocols of the same mode. Suitable sensors may communicate sensed data with a mobile surveillance appliance using one or both communication modes. Intermodal communications between fixed and mobile wireless networks or between packetized data and telephony networks, while possible, are not a requirement.

Dual-mode (fixed/mobile wireless) mobile surveillance appliances, configured in accordance with the present invention, synergistically meld the advantageous characteristics of both packetized data network and telephony modes of operation. For example, wireless personal data terminals are mobile communications appliances that transmit data signals over packetized data networks, such as the Internet. Wireless personal data terminals enable a stationary or low-mobility user to communicate with nearly any other data terminal connected to, or service provided on, the Internet, at a very low per-user cost. Wireless portions of these data networks are operated using radio-based, fixed wireless network access protocols. In general, fixed wireless network access protocols include the IEEE STD. 802 wireless LAN/MAN protocols, the ETSI Broadband Radio Access Networks (BRAN) protocols, and the Korean TTA wireless broadband protocols. The IEEE 802 wireless protocols can include 802.11 wireless protocols (WiFi®), 802.15 wireless protocols (Bluetooth®), and the 802.16 protocols (WiMAX®). The ETSI/BRAN protocols may include HIPERLAN/1, HIPERLAN/2, HIPER-ACCESS, and HIPERMAN protocols. The Korean TTA wireless broadband protocols generally correspond to the WiBRO protocols. For the most part, each of these protocols specifies only the lowest two layers of the Reference Model for Open Systems Interconnection (OSI). As used herein, the term "WLAN" and fixed wireless networking includes both local are networking and wide area networking. Local area networking can include personal area networking, including the use of piconets, as described in the context of IEEE 802.15-related protocols. Wide area networking further can include wide area cellular networking. Fixed wireless network access protocols, which frequently employ a switched packet store-and forward communication paradigm for inexpensive bulk data signal transfers. Fixed wireless networking allows fixed wireless service operators to offer a communication portal as a "hotspot," or signal coverage zone, having a typical diameter of less than 300 meters, although clusters of hotspots and metropolitan-wide coverage may provide greater range to users of fixed wireless networking.

In the United States, equipment following the IEEE 802.11x (WiFi®) standards achieved widespread acceptance and use. Many thousands of WiFi® hotspots are located worldwide in venues like airports, shops, and social gathering areas. A venue operator may offer a WiFi® fixed wireless access hotspot as a convenience to its customers, under an agreement with a fixed wireless service operator. However, fixed wireless links sharply restrict the mobility of wireless users because these links typically lack the interzonal handoff capabilities and the mobile user location awareness that simplify roaming network connectivity. In addition, fixed wireless networking facilities usually operate under an Internet Service Provider (ISP) paradigm with hot spots in a region being hosted by a patchwork of fixed wireless service operators, each of whom, in turn, may be provisioned fixed-link network access and bandwidth by an ISP. The ISP paradigm may offer customer service, charging, billing, and security services to a fixed wireless operator client, but not to the operator of the hotspot venue or to a mobile user, who may be a venue customer. Moreover, delay-sensitive data signals requiring pleisochronous (near-real-time) management, such as voice or real-time interactive multimedia displays can be afforded a higher Quality of Service, although usually at a premium. Further, some fixed wireless networking protocols offer limited communication security. Nevertheless, fixed wireless data networking tends to be an inexpensive mode of wireless networking that tends to favor stationary or low-mobility users.

By comparison, a mobile wireless telephone offers voice and data services using technologies that conform to international radiocommunication (hereinafter, cellular) standards developed under the aegis of the International Telecommunications Union Standards group (ITU-T) and other global standard-setting bodies. These standards include digital cellular telephony protocols enhanced with packetized data capabilities (2.5G); packetized digital cellular telephony protocols (3G); packetized digital cellular telephony protocols enhanced by selected broadband digital data services (3X); and successor telephony protocols, which offer a vast array of broadband mobile wireless capabilities (4G). IMT-2000 is the current global standard for third generation (3G) wireless communications, defined by a set of interdependent ITU Recommendations that is being implemented worldwide. IMT-2000 provides a framework for global wireless access by linking the diverse systems of terrestrial and/or satellite based networks.

By conforming to these standards, current cellular terminals enjoy a wide degree of interoperability. Cellular telephony networks can be coupled to fixed-wire telephony networks, primarily because each are designed to employ a switched circuit, point-to-point communication paradigm, which facilitates pleisochronous and other delay-sensitive communications. Cellular technologies provide broad service coverage by employing multiple, overlapping coverage areas (cells), with each cell having a diameter ranging typically from 1 km to 50 km. Using sophisticated handoff and user tracking procedures, cellular networks are suitable for point-to-point communications by highly mobile users roaming within a vast geographic area. Suitable for highly mobile users (space, time, or both), cellular networks are managed by relatively large regional or national wireless telephony operators, with sophisticated customer service, charging, billing, and security capabilities.

Although largely compatible, mobile wireless networks are not completely homogeneous. For example, the physical layers, operating frequencies, and security techniques may differ among adjacent territories. In addition, the accounting, access, and authentication processes of one mobile wireless provider in a particular mobile wireless region may not be used by an adjacent provider, thereby impeding mobile wireless communication. Some incompatibilities may be surmounted by physically replacing an incompatible profile card disposed within the mobile phone with a compatible profile card. Roaming charges among disparate systems and tariff zones may make communication over mobile wireless networks quite costly, particularly for bulk data transfers, or inconvenient for quick communications. Thus, despite certain advantages, mobile wireless service may be unavailable or undesirable to a mobile user. On the other hand, a mobile user with access to a fixed wireless link may communicate over the Internet, including voice communication services implemented with the Voice over Internet Protocol (VoIP) services. A mobile user equipped with a mobile communication appliance, having both mobile wireless and fixed wireless capabilities, may place a telephone call using VoIP, in place of cellular, technology.

Advantageously, modern mobile wireless telephones are multifunctional mobile communications appliances that integrate the characteristics of wireless networking and wireless telephony, and that feature an operating system and programming capabilities supporting advanced service functions, such as a video display and programmable keys, and sophisticated programmability features. In particular, dual-mode mobile wireless telephones offer wireless access to both telephony-type (point-to-point) and packetized data-type (store-and-forward) networks to a mobile user from many places throughout the world. For example, a mobile user may employ a dual-mode mobile wireless telephone using a first wireless mode to receive bulk data signals, for example, from a remote sensing post, and a second wireless mode to send point-to-point voice signal or message. The first wireless mode may be a fixed wireless networking mode and the second wireless mode can be a mobile wireless networking mode. It is desirable to implement selected embodiments of a mobile surveillance appliance (MSA) according to the present invention, using a dual-mode mobile wireless telephone. One example of such a dual-mode wireless phone can include a Motorola® CN620 Mobile Office Device, and another example is a Motorola® A910 Dual-Mode Phone, although many other dual mode devices can be suitable for a MSA. As used herein, the term remote is indicative of inaccessibility, representing a relative spatial relationship by which one entity is set apart from another, irrespective of distance. For the most part, remote can be understood to be relative to a mobile user.

In a mobile surveillance system, a MSA receives data from a remote sensing post (RSP). A suitable sensor for a RSP can be exemplified by a webcam, may be capable of capturing frame-sampled or streaming video images, which are representative of a predefined remotely monitored space (RMS). A webcam typically is configured to convert captured video images into sensed data, and to transmit the sensed data, using an Internet Protocol (IP) protocol, over packetized data network (e.g., the Internet). The MSA, when coupled to the Internet using a fixed wireless link supporting the IP protocol, can be configured to receive the sensed video data and to provide a perceivable representation of the sensed remote video data to the mobile user on a video display. Advantageously, a webcam can be adapted to respond to sound, motion, light, heat, or nearly any physically detectable quantity. A webcam also can be self-contained and require no adjacent personal computer to provide network services. Furthermore, some webcams can be manipulated remotely from over the Internet, changing zoom, scan position, and frame delivery by simple commands. Selected webcams also may store sensed data on a hard drive, or equivalent, are make the sensed data available upon command from an MSA. A Linksys® Wireless-G Internet Video Camera (Linksys Corporation, Irvine, Calif.) is a webcam that can capture and transmit sensed data, in video format, as described herein, although other webcams may be used.

Accordingly, FIG. 1 illustrates mobile surveillance system 100, which generally includes MSA 105 communicating with RSP 111. A mobile user (MU, not shown) can use MSA 105 to receive from RSP 111 sensed data representative of event 125 at selected remote physical location (RPL) 121. RSP 111 can monitor a predetermined RMS 127, and can transmit remote sensed data to MSA 105. MSA 105 can provide a perceivable representation of event 125, for example, by imaging received sensed video data on MSA display 107. RSP 111 may be coupled to ISP 117 through a network interface having a globally-unique media access control address (MAC address), and a logical Internet Protocol address (IP address), which is unique within a defined logical network known to ISP 117. MSA 105 may use an IP address of RSP 111 to identify a logical source address for sensed video data transmitted over IP network 115. RSP 111 may so transmit sensed video data in response to an intervention command received from MSA 105 (e.g., a PULL operation), or in response to a RSP transmission protocol (e.g., a PUSH operation).

To create a communication link with MSA 105, RSP 111 may be coupled through ISP 117 to IP network 115 and, in turn, to WSP 110. MSA 105 may communicate over wireless networking link (NLINK) 141 with WSP 110. MSA 105 includes a first transceiver (implicit, not shown) capable of transmitting and receiving over NLINK 141, according to a wireless networking protocol. Upon perceiving event 125, the MU may effect a remote intervention for perceived event 125 at RPL 121, by activating MSA intervention controller 109. Controller 109 can be, for example, a programmable key which cooperates with a S&I application program to cause MSA 105 to form a remote intervention request (RIR) 165. Advantageously, activation of controller 109 also may cause a program executing on MSA 105 to extract USI 121, or a representation thereof, from received video data, and, if desired, to encode USI 121 onto RIR 165. Controller 109 also may be used to initiate transmission of RIR 165 to a remote agent or intervener, for example, RA 150. To this end, MSA 105 can communicate RIR 165 over radiotelephony link (RLINK) 160 to cellular provider 162, for example using a second transceiver (implicit, not shown). Cellular provider 162 can be coupled to telephony network 164, to which RA 150 also may be coupled by fixed-wire public switched telephone network (PSTN) 166, thereby providing a communication path by which RA 150 can receive RIR 165 from MSA 105. Typically, the content of RIR 165 directs RA 150 to respond, and to bring about, melioration of event 125 perceived at RPL 121. RA 150 may respond on behalf of the MU, directly or indirectly through a second remote intervener, such as remote responder (RR) 175. In an exemplary direct response, RA 150 may command an employee or designate to travel to RPL 121, to investigate the perceived circumstance, and to undertake melioration. In an exemplary indirect response, RA 150 can issue to RR 175 over radio link 170 a directive to undertake a melioration of perceived event 125, which may be a preselected melioration. RA 150 may carry out the ends, expressed or implied, by RIR 165 pursuant to a service contract with the MU, by mutual agreement, by law, or by protocol. Likewise, a service agreement, a mutual agreement, a law, a protocol may generally describe the authority under which RA 150 may prevail upon RR 175 to carry out the ends, expressed or implied, by RIR 165. The MU also may communicate RIR 165 directly to RR 175, alone, in place of, or in combination with, communicating RIR 165 to RA 150. In addition, the MU may use MSA 105 to communicate with the remote intervener, which may be one or both of RA 150 and RR 175. Because telephony signals may be conveyed using packetized data, internetwork link 190 is representative of internetwork coupling that may allow RIR 165 to be communicated over IP network 115. Although RA 150 is illustrated as being coupled to telephony network 164 via fixed-wire PSTN 166, and RR 175 is illustrated as communicating with RA 150 over link 170, it is understood that RA 150, RR 175, or both, may receive telephony signals transmitted of IP network 115, for example, using well-known Voice-over-Internet Protocol (VoIP) communications apparatus. Furthermore, RA 150 and RR 175 are generally representative of a remote intervener. However, a remote intervener also may include a remote automated intervener disposed to be positioned at RPL 121 or RMS 127, which is adapted to take a melioration of perceived event 125 in response to receiving RIR 165.

It is desirable that RMS 127 have a predetermined spatial location, relative to RPL 121. This predetermined spatial location may not be ascertainable solely from the logical IP address of RSP 111. Desirably, USI 131 can be used to identify a predetermined spatial location of RSP 111 and, by extension, of RMS 127, relative to the general location of RPL 121. USI 131 may correspond to the geographic coordinates of latitude and longitude of selected RPL 121, with an accurate representation of a given point of the Earth being theoretically determinable to within about 10 centimeters. For example, USI 121 may be identified with the geographic coordinates of RPL 121, Latitude: 39°26'52.78"N and Longitude: 119°3'43.19"W. RA 150 and RR 175 may use geographic-coordinate-based position locating systems and devices, which may include well known Global Positioning System (GPS) and GPS locating devices, to identify the vicinity of RPL 121-124. In many cases, a simple geographic coordinates can be a spatial descriptive attribute capable of providing sufficient spatial resolution. Using the above coordinates, an exemplary USI 131 may be "39d26m52.78sN; 119d3m43.19sW." In other cases, it may be beneficial to augment a spatial descriptive attribute with a non-spatial descriptive attribute to provide additional guidance for finding RMS 127. For example, a non-spatial descriptive attribute may be "bedroom" (BDRM). With this augmentation, an exemplary USI 131 may be "39d26m52.78sN; 119d3m43.19sW; BDRM." In selected embodiments of the present invention, descriptive attributes for respective RMS 127 may be stored in a memory element of MSA 105 (implicit, not shown) to be retrieved when intervention controller 109 is activated while RMS 127 is being viewed, for example, on MSA display 107. RIR 165 can be constituted of descriptive attributes retrieved from memory, or of a compact token representative of these attributes.

In some circumstances, standard geographic coordinates describe a two-dimensional spatial model, whereas the Earth and structures proximate to its surface exist in three-dimensions. In densely-developed areas or in multi-story structures, individual compartments or structures, such as RMS 127, may be horizontally proximate or overlapping, but displaced vertically by hundreds of meters to perhaps less than a few tens of centimeters, adding ambiguity to a two-dimensional spatial location defined over three-dimensions. Such positioning ambiguity can be potentially problematic for a remote intervener, such as RA 150 or RR 175, who may be unfamiliar with the actual position of RMS 127 relative to RPL 121. Positioning ambiguity may introduce undesirable delay in carrying out as requested intervention, while the remote intervener tries to resolve the vertical spatial ambiguity. Current Global Positioning System (GPS) sensing and positioning technology may exacerbate two-dimensional positioning ambiguity in a three-dimensional reference frame by introducing vertical plane positioning errors that may vary up to four orders of magnitude from a precise location (i.e., positioning errors ranging from a few centimeters to over one hundred meters).

Thus, for selected embodiments of the present invention, it is desirable to augment a portion of USI 131, which may represent standard geographic coordinates, with additional spatial data to improve spatial positioning resolution. It also may be desirable to augment USI 131 with non-spatial data, which may be useful to an intervener desiring to effect melioration upon the event perceived on MSA display 107 and corresponding to RIR 165, despite chaotic or confusing circumstances. Conveniently, Geographic Information Systems (GIS) devices and techniques may be used to collect and manage spatial and non-spatial data that may be associated with USI 131. Thus, selected embodiments herein may provide USI 131 with descriptive attributes referencing RMS 127 to a unique place on Earth, using geographically referenced spatial data, such as latitude and longitude, as augmented with state plane, elevation, and UTM data. Relative location-centric descriptive attributes may be used to augment USI 131 with non-spatial and with relative spatial data. Spatial location-centric descriptive attributes can provide information allowing an intervener to locate RMS 127 quickly and correctly, which may otherwise be difficult to find in RPL 121. Pertinent relative spatial location-centric descriptive attributes can include location, proximity, and spatial distribution of RMS 127 relative to spaces and landmarks associated with RPL 121 and its environs. Pertinent non-spatial, location-centric descriptive attributes can include nearly any pertinent characteristic that may be useful to the MU using MSA 105, to an agent of the MU, or to a remote intervener confronted by an emergent situation demanding timely arrival at RPL 121, and prompt initiation of a melioration in RMS 126. In one example, suitable relative spatial location-centric descriptive attributes may indicate a building quadrant (e.g., NE, NW, SW, SW), an identifiable building section, a particular floor in a multistory building, a reference direction relative to the floor layout (e.g., inboard or outboard), a suite number or room number, or other spatial attributes of RMS 127. Where RPL 121 is a corporate setting, exemplary non-spatial descriptive attributes may include: building owner name; building designation, number, or identifier; emergency contact information; the existence and nature of hazards or hazardous materials to which interveners, RA 150, RR 175 may be exposed; the existence of mobility- or medically-impaired individuals within RMS 127; and specific reference data (e.g., keypad door lock access codes). Where RPL 121 is a private residence or health care setting, suitable non-spatial, location-centric descriptive attributes may include, without limitation: emergency contact information, a roster of residents or patients in or around RMS 127, physical identifiers of persons of interest, the existence and nature of hazards to which interveners RA 150, RR 175 may be exposed, and a coded identifier for health records of a resident, a patient, and so on. USI 131 also may be augmented with non-spatial network-centric descriptive attributes, for example, which may include one or both of the IP address and the MAC address associated with RSP 111. The pertinent descriptive attributes that may augment USI 131 are not limited to the nature and types illustrated in the above examples. USI 131 also may have encoded therein, remote intervention commands to which a remote automated intervener may respond under the control of MSA 105.

Of course, the benefits of increased information may need to be weighed against added costs incurred by processing greater amounts of data, particularly where time may be of the essence. Although these costs may be significant taken together, any or all of data corresponding to RMS 127 may be encoded on USI 121. In applications where efficiency may be advantageous, unique location code (ULC) can be a compact token assigned to, and representative of, USI 121. Furthermore, an event identifier can be provided such that the nature of perceived event 125 can be included with RIR 165. The event identifier may be encoded onto, or supplement, USI 121 or a ULC corresponding to USI 121. When received by an intervener having a database storing all or part of USI 121-related data, the ULC may be used as an index key of a database of the descriptive attributes constituting USI 131. Such a database may be disposed entirely in MSA 105, be disposed completely within the control of a remote intervener, such as RA 150, or may be distributed between MSA 105 and a remote intervener. Conveniently, it may be desirable to include a World Wide Web Uniform Resource Identifier (URI) as an entry in the database, where it is desirable to link to data, rather than to incorporate into the database all of the USI-related data represented by the link.

Figure 2:
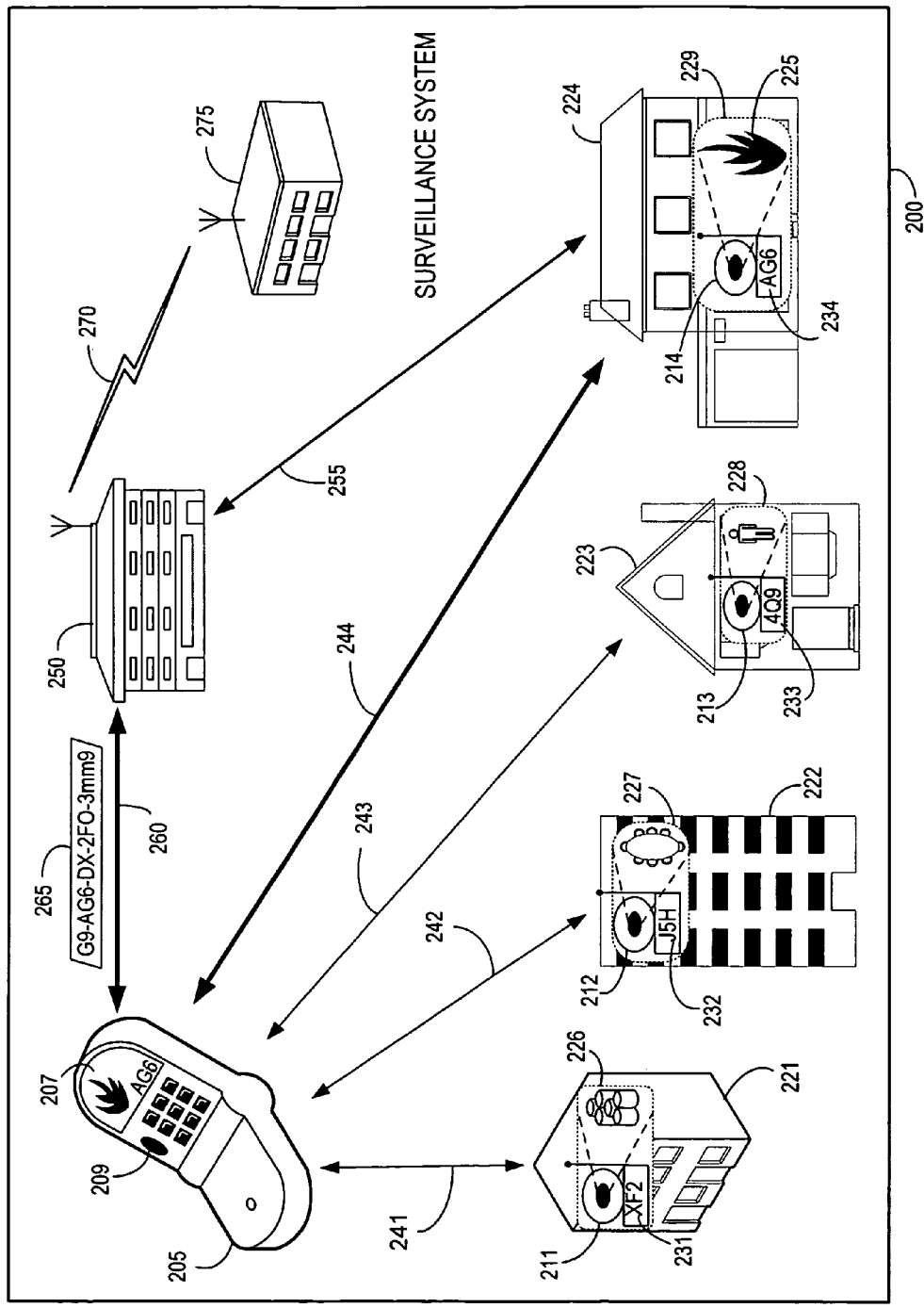
FIG. 2 is a simplified illustration of another exemplary embodiment of a surveillance system, according to the present invention.

Turning to FIG. 2, mobile surveillance system 200 can be functionally similar to mobile surveillance system 100 in FIG. 1. In addition, certain simplifications of portions of FIG. 1 are illustrated in FIG. 2. For example, each of network links (NPATHS) 241-244 may represent a packetized data network link formed between MSA 105 and RSP 111, including fixed wireless link NLINK 141 from MSA 105 to a fixed wireless access point provided by WSP 110, IP network 115, ISP 117, RSP 111, and packetized data network links therebetween. Similarly, telephony link (TPATH) 240 may represent a telephony link formed between MSA 105 and RA 150, including a mobile wireless link TLINK 160 from MSA 105 to a mobile wireless access point provided by cellular provider 162, telephony network 164, PSTN 166, RA 150, and the telephony network links therebetween. Although not explicitly shown, intermodal communication link 190 also may constitute at least a portion of TPATH 240.

MSA 205 in FIG. 2 can be functionally similar to MSA 105 in FIG. 1. Using principles elucidated above, MSA 205 can be a dual-mode (fixed/mobile) wireless mobile telephone, having display 207 and intervention controller 209, and being configured to monitor multiple locations, for example, by receiving data from a selected one of RSP 211-214 corresponding to a respective one of RMS 226-229, which are associated with a respective one of RPL 221-224. Intervention controller 209 is illustrated to be a key or touch-button, but intervention controller 209 also may be activated by MU speech, for a speech-enabled MSA 205. RSP 211-214 may be webcam capable of sensing and capturing as data an imageable representation of RMS 226-229, and of transmitting the imaged data over NPATH 241-244 to MSA 205, in a manner similar to RSP 111 in FIG. 1. MSA 205 can be connectable to the Internet using, for example, a fixed wireless network service. MSA 205 can communicate with at least one RSP 211-214 over NLINK link 241-244, and receive video data on MSA display 207 for monitoring RMS 226-229. MSA 205 may receive from, and display, the sensed data received from RSP 211-214, by manual selection, e.g., using the telephone keypad, or by way of a surveillance and intervention (S&I) applet executing on a processor within MSA 205. Conveniently, a S&I applet can automate selection of RSP 211-214; may be used to interact with a video sensor of RSP 211-214 over NLINK 241-244; and may manipulate the sensed video data therefrom. As with USI 111 and RSP 111 in FIG. 1, unique spatial identifier USI 231-234 can identify respective ones of RSP 211-214 and, by extension, respective ones of RMS 226-229. USI 231-234 are illustrated, for simplicity, by an exemplary, but arbitrary, three-alphanumeric-character ULC. USI 231 is represented by ULC "XF2," USI 232 by ULC "J5H," USI 233 by ULC "4Q9," and USI 234 by ULC "AG6." For purposes of illustration in FIG. 2, respective ULC 231-234 may be considered as synonymous with USI 231-234. Thus, data sensed by RSP 214 in RMS 229, which is associated with RPL 224, can include and be spatially identified by ULC 234 ("AG6").

In a further example of embodiments of the present invention, the MU can be a executive waiting at an airport over 10,000 km from home. The MU may have a service agreement with RA 150 to undertake selected remote intervention for selected event at a predetermined remotely monitored space at a predetermined physical location. The airport may be a wireless service provider, similar to WSP 110, providing to MSA 205 a WiFi® fixed wireless link, such as NLINK 141 in FIG. 1 and which a portion of NPATH 241 in FIG. 2. When coupled to NPATH 241, and executing a S&I applet on MSA 205, the executive may monitor multiple remotely monitored spaces in multiple remote physical locations at different places throughout the world. Non-inclusive examples of remotely monitored spaces include a selected repository (RMS 226) in a remote warehouse (RPL 221), a selected office suite (RMS 227) in a remote office building (RPL 222), the kitchen (RMS 228) in the home of the executive's parents (RPL 223), and the family room (RMS 229) in the executive's home (RPL 224). In this example, the unique spatial location of selected repository can be represented by ULC 231 ("XF2"), the selected office suite by ULC 232 ("J5H"), the parents' kitchen by ULC 232 ("4Q9"), and the family room by ULC 234 ("AG6"). During the course of monitoring on MSA display 207, the MU may perceive event 225, e.g., a fire, occurring in mobile user's family room, RMS 229. Upon perceiving event 225, the MU activates intervention controller 207, causing MSA 205 to extract the spatial location of event 225 from the sensed video data from RSP 214, here ULC 234 in the form of code "AG6." Intervention controller 207 also can cause MSA 205 to generate RIR 265. Exemplary RIR 265 is illustrated to be "DX-2FO-3mm9-G9-AG6," which may be generated from five tokens. The first token of exemplary RIR 265, e.g., "DX," may indicate the class of service, or nature of service agreement between the MU and RA 250. The second token, e.g., "2FO," may identify the nature of interaction between the MU and RA 150 until event 225 is resolved. For example, one meaning of token "2FO" may direct RA 150 to contact the MU using MSA 205 telephonically (i.e., over TPATH 260), confirming remote intervention initiation, and to provide periodic status and contact updates to MSA 205 via e-mail at an e-mail address associated with MSA 205. In addition, token "2FO" may authorize RA 250 to initiate situational monitoring and intervention via responder link 255, for example, causing RSP 214 to feed sensed video data to RS 250, perhaps identified by ULC 234, as well. Within the context of the agreement, by protocol, or by law, first remote intervener RA 250 may be authorized to request the assistance of second remote intervener RR 275, e.g., a public fire department. The third token, "3mm9," can be a personal security number, identifying the MU and authenticating the intervention request. The fourth token of RIR 265, i.e., "G9," may identify the nature of perceived event 325, e.g., a fire, and request RA 250 to dispatch fire and rescue services to a specified location due to perceived event 225 being a fire. The fifth token, "AG6," can be ULC 234 indicating that event 225 is occurring in RMS 229 at RPL 224. Although it is sufficient that ULC 234 be representative of the unique spatial location of RMS 229, it also may be representative of non-spatial information relative to RMS 229, as well as to RPL 224, which may be useful to alert RA 150, RR 275 in taking such additional precautions. For example, a family pet—a large dog—may be at home 224; and several gallons of volatile solvents may be disposed in a loft within home 224, as well. The dog, if upset, may represent a risk of harm to an uninformed intervener, as may be the volatile solvents, unless additional precautions are taken. ULC 234 can be an index into a USI database, possibly maintained by RA 250, in which the presence of the dog, and the presence, location, and nature of the stored solvents (e.g., CAS numbers used by first responders), may be stored as non-spatial, location-centric descriptive attributes.

MSA 205 can be configured to communicate using application-layer, text-based, messaging protocols. Advantageously, the Internet Engineering Task Force defined a suite of interactive multimedia communication protocols, which have been adopted by corresponding telephony and the data networking industries, affording a common language for upper-layer communication management. Appliances such as MSA 205 may be adapted to provide services over telephony networks and packetized data networks, using an application-layer, text-based, messaging protocol. MSA 205 can be configured with operating system functions and application programs supporting telephony services by the use of this upper-layer communication management.

Although telephony services include mobile wireless services and fixed-wire telephony services coupled thereto, telephony services also may include fixed wireless services and data networking services, for example, in the implementation of Voice over Internet Protocol (VoIP) telephony services over the Internet. Thus, MSA 205 may receive sensed data as a bulk data transfer from RSP 211-214, for example over an inbound WiFi® link, as the MU uses MSA 205 to send RIR 265, to make a VoIP telephone call, or to coordinate with RSP 211-214 a remote automated event intervention, over an outbound WiFi® link to the Internet. This capability is beneficial, for example, when mobile wireless links are unavailable or undesirable. Embodiments of the invention herein encompass implementations where MSA 205 may be adapted to communicate using a second fixed wireless protocol, such as an IEEE 802.11, IEEE 802.15 protocol, an 802.16 protocol, a HIPERLAN/2 protocol, a HIPERMAN protocol, or a WiBRO protocol, as well as protocols supporting IEEE 802.1x port-based access control WLAN protocol.

Session Initiation Protocol (SIP) is representative of an upper-layer, text-based, messaging protocol. As used herein, SIP encompasses lower-layer supporting protocols, which collectively implement call management for interactive Internet conferencing, telephony, presence, events notification and instant messaging, and which may be used to establish, modify and terminate "sessions" over IP networks. These sessions could be as basic as a telephone call, or as complex as a multi-party mixed media session. SIP can be representative of nearly any upper-layer, text-based messaging protocol, which permits simplified message analysis and formation.

Messages received by MSA 205 may include character-text headers, from which can be determined an SIP message source, destination, and purpose, as well as administrative and security information, and the like. If a data payload is present in the message, then text-based payload delimiters may be included, along with the payload. Similarly, messages transmitted by MSA 205 may be formed and encoded with source and destination identifiers of the message to be transmitted by MSA 205, along with administrative data, security information, etc. If a data payload is in the message to be transmitted by MSA 205, text-based payload delimiters can be included with the payload. Within the context of the present invention, MSA 205 can communicate with RSP 211-214 to receive a first message over a fixed wireless network, and to transmit a second message to RA 250 over a mobile wireless network, responsive to receiving the first message. In general, SIP-capable communications between MSA 205 and RSP 211-214 and between MSA 205 and RA 250 may be loosely described as type of a reply-response exchange.

Although many types of reply-response exchanges may be realized through existing SIP messages and headers, for simplicity of illustration, an INVITE message is illustrated as an archetypal reply-response exchange that may occur between RSP 211-214 and MSA 205, or between MSA 205 and a remote intervener, RA 250, RR 275. MSA 205 can transmit to RSP 211-214 an INVITE message initiating video data capture and transmission, and providing RSP 211-214 with a return IP address corresponding to MSA 205 to which the sensed video data is to be transmitted. In response, RSP 211-214 can acknowledge receipt of the INVITE to MSA 205, and then establish a session with MSA 205 by which RSP 211-214 transmits sensed video data to MSA 205 over NPATH 241-244.

As described in the previous example, the MU can observe perceivable representations of RMS 226-229 on MSA display 207. Upon perceiving event 225 occurring in RMS 226-229, the MU can activate intervention controller 209, by making a single keystroke on controller 209 of MSA 205, by a keystroke on controller 209 and a keystroke on a keypad on MSA 205, by issuing a voice command to a voice-command-capable MSA 205, or by a combination thereof. In certain embodiments, MSA 205 can determine the spatial location corresponding to perceived event 225 observed on MSA display 207 by extracting USI 231-234 from the sensed data. If the USI is encoded as an ULC, then MSA 205 causes ULC 231-234 to be extracted. Activation of intervention controller 209 also can cause MSA 205 to generate RIR 265, and an outbound SIP INVITE message. The extracted spatial information, for example, ULC 231-234, may be encoded onto RIR 265, or may be included with RIR 265, which itself can be encoded onto an intervention message, such as an outbound SIP INVITE message. Activation of intervention controller 209 also may cause MSA 205 to transmit the outbound SIP INVITE message (intervention message) over TPATH 260 to remote intervener RA 250, RR 275. Upon receiving the intervention message from MSA 205, remote intervener RA 250, RR 275, can determine the selected remote intervention, and the predefined spatial location of the remotely monitored space for which the selected remote intervention is requested, and may respond thereto, thereby effecting the selected remote intervention at the event. The outbound SIP INVITE message also can be used to establish a session with remote intervener RA 250, RR 275. Other SIP response and reply messages may be used as well. For example, many webcams are coupled to motion and sound sensors, and are capable of initiating data transmission to MSA 205 when a sensed condition occurs in RMS 226-229. The sensed condition may indicate, for example, the occurrence of event 225. The MU can cause MSA 205 to generate and transmit a SIP SUB- SCRIBE request message to RSP 211-214, subscribing to a server function of RSP 211-214. Upon the occurrence of the sensed condition, RSP 211-214 may alert the MU by transmitting a SIP NOTIFY response message to MSA 205. MSA 205 may then transmit a SIP INVITE message back to RSP 211-214, negotiating sensed data transfer from RSP 211-214 to MSA 205, which may include sensed video data, sensed audio data, and other sensed data, within the capability and configuration of RSP 211-214. RSP 211-214 also may initiate a SIP INVITE message to MSA 205, and may commence server push of sensed data to MSA 205. Although the remote intervener has been illustrated in the context of a human agent remote intervener, including organizations, such as S&I, public safety, and law enforcement interveners, a remote intervener also can be a remote automated intervener, configured to be controlled, at least in part, by MSA 205. A remote automated intervener can be drawn from a diversity of remote-controlled effectors, including fire control, security, protective, and health-related apparatus, which may be activated in place of, or in cooperation with, one or more human agent intervener.

FIG. 3A illustrates an exemplary SIP message header 300 that is identified as a SIP INVITE message header 305. In accordance with standard SIP practice known to those of ordinary skill in the art, the SIP message header also includes a destination address 310 and a source identifier 315. Furthermore, a general SIP message includes a CALL_ID identifier 325 that typically is unique to the calling SIP client, here MSA 205, that permits the SIP server, here, a selected RSP 211-214, to identify the receiving point to which transmissions to client MSA 205 can be directed. In general, these fields are common to most SIP request/reply messages, including without limitation SUBSCRIBE, NOTIFY, and INVITE SIP messages. Selected embodiments of the present invention are capable of implementing a surveillance system, such as system 100 in FIG. 1 and system 200 in FIG. 2 using SIP messages with SIP headers generated using standard SIP techniques.

FIG. 3B illustrates another exemplary SIP message header 350 that also is identified as a SIP INVITE message header 355. In accordance with standard SIP practice known to those of ordinary skill in the art, the SIP message header also includes a destination address 360 and a source identifier 365, as in FIG. 3A. However, SIP CALL_ID identifier 375 may be modified to provide the exemplary RIR 265, in FIG. 2, namely, "DX-2FO-3mm9-G9-AG6" or equivalently, "DX2FO3mm9G9AG6", in place of a standard CALL_ID identifier, such as CALL_ID identifier 325 in FIG. 3A. It may be advantageous for MSA 205 to form RIR 265, and to transmit a SIP message, such as a SIP INVITE message, having CALL_ID 375 thus modified. Upon activating controller 209, MSA can generate RIR 265, and a SIP-capable applet executing on a processor within MSA 205 can substitute RIR 265 in CALL_ID identifier 375 header, so that RIR 265 can be dispatched to remote intervener RA 250, RR 275 in a single, relatively simple SIP message.

Many substitutions, modifications, alterations, and equivalents may now occur and be made by those having ordinary skill in the art, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent and what incorporates the idea of the invention.

What is claimed is:

1. A mobile communications appliance, comprising:
   a first transceiver configured to receive sensed data from a remote sensing post over a first wireless link, wherein the sensed data is representative of a remotely monitored space having a predefined spatial location;
   a display coupled to the first transceiver and adapted to transform the sensed data into a perceivable representation of the remotely monitored space;
   an intervention controller coupled to the display and wherein when activated in response to an event perceived on the display the intervention controller is configured to generate a representation of a unique spatial identifier corresponding to the predefined spatial location of the event in the remotely monitored space, wherein the unique spatial identifier includes geographic coordinates corresponding to the predefined spatial location, the intervention controller is configured to select an event melioration corresponding to the event, and the intervention controller is configured to generate a remote intervention request corresponding to the predefined spatial location and the event melioration; and
   a second transceiver configured to transmit the remote intervention request to a remote intervener over a second wireless link in response to the intervention controller being activated, wherein the mobile communications appliance is a mobile surveillance appliance.

2. The mobile communications appliance of claim 1, wherein the sensed data received from the remote sensing post is sensed video data representative of the remotely monitored space; wherein the perceivable representation of the remotely monitored space is visual and the display is a video display.

3. The mobile communications appliance of claim 1, wherein the first wireless link is a fixed wireless link and the second wireless link is a mobile wireless link.

4. The mobile communications appliance of claim 3, wherein the sensed data received from the remote sensing post is sensed video data representative of the remotely monitored space;
   wherein the perceivable representation of the remotely monitored space is visual and the display is a video display; wherein the unique spatial identifier includes geographic coordinates corresponding to the predefined spatial location;
   wherein the fixed wireless link is configured according to an IEEE 802.11 wireless communication protocol; and
   wherein the mobile wireless link is configured according to an ITU International Mobile Telecommunications-2000 wireless communication protocol.

5. The mobile communications appliance of claim 2, wherein the first wireless link is a fixed wireless link and the second wireless link is a mobile wireless link.

6. The mobile communications appliance of claim 5, wherein the fixed wireless link is configured according to an IEEE 802.11 wireless communication protocol.

7. The mobile communications appliance of claim 6, wherein the mobile wireless link is configured according to an ITU International Mobile Telecommunications-2000 wireless communication protocol.

8. The mobile communications appliance of claim 6, wherein the mobile wireless link is configured according to an ITU International Mobile Telecommunications-2000 wireless communication protocol.

9. The mobile communications appliance of claim 8, wherein the intervention controller generates the remote intervention request using an application-layer, text-based, messaging protocol.

10. The mobile communications appliance of claim 1, wherein the intervention controller generates the remote intervention request using a Session Initiation Protocol application-layer, text-based, messaging protocol.

11. The mobile communications appliance of claim 4, wherein the intervention controller generates the remote intervention request using a Session Initiation Protocol application-layer, text-based, messaging protocol.

12. The mobile communications appliance of claim 11, wherein the mobile surveillance appliance requests sensed data transmission from the remote surveillance post using a first message conforming to Session Initiation Protocol, wherein remote sensing post notifies the mobile surveillance appliance of sensed data being available using a second message conforming to Session Initiation Protocol, and wherein the mobile surveillance appliance establish a communications session using a third message conforming to Session Initiation Protocol, whereby the mobile surveillance appliance causes the remote sensing post to transmit the sensed data.

13. The mobile communications appliance of claim 12, wherein the mobile surveillance appliance encodes the remote intervention request on an outbound Session Initiation Protocol message to the remote intervener.

14. The mobile communications appliance of claim 1, wherein the geographic coordinates are sent in a Session Initiation Protocol (SIP) INVITE message.

15. The mobile communications appliance of claim 1, wherein the intervention controller is activated by key or button on the controller being selected.

16. A mobile surveillance method, comprising:
 a. receiving a remote intervention request in an outbound intervention message from a mobile surveillance appliance, wherein the remote intervention request corresponds to a perceived event represented on the mobile surveillance appliance, and wherein at least a portion of the receiving includes receiving over a wireless link coupled to the mobile surveillance appliance;
 b. determining a predefined spatial location of a remotely monitored space for the perceived event from geographic coordinates included with a unique spatial identifier contained within the remote intervention request;
 c. determining a selected remote intervention corresponding to an event perceived in the remotely monitored space from the remote intervention request.

17. The mobile surveillance method of claim 16, wherein the outbound intervention message is a Session Initiation Protocol message upon which the remote intervention request is encoded, wherein the determining the predefined spatial location includes analyzing a header of the a Session Initiation Protocol message and determining the predefined spatial location therefrom; and determining the selected remote intervention includes analyzing the header of the a Session Initiation Protocol message and determining the selected remote intervention therefrom.

18. The mobile surveillance method of claim 17, further comprising effecting a remote intervention to the perceived event in response to receiving the remote intervention request.

19. The mobile surveillance method of claim 18, wherein the wireless link coupled to the mobile surveillance appliance is one of a fixed wireless link and a mobile wireless link.

20. The mobile surveillance method of claim 19, wherein the fixed wireless link is configured according to an IEEE 802.11 wireless communication protocol and the mobile wireless link is configured according to an ITU International Mobile Telecommunications-2000 wireless communication protocol.

21. The mobile surveillance method of claim 16, wherein the geographic coordinates are received in a Session Initiation Protocol (SIP) INVITE message.

22. A mobile surveillance system, comprising:
 a. a remote sensing post configured to sense data representative of a predefined remotely monitored space corresponding to a unique spatial location, and coupled to a packetized data network capable of transmitting the sensed data from a fixed wireless access point using a wireless link; and
 b. a mobile surveillance appliance configured to receive the sensed data from the fixed wireless access point using a first wireless link configured according to an IEEE 802.11 wireless communication protocol, wherein the mobile surveillance appliance is configured to provide a perceivable representation of the sensed data, wherein the mobile surveillance appliance is configured to determine the unique spatial location corresponding to the sensed data from geographic coordinates contained in a unique spatial identifier, wherein responsive to an event determined from a perceivable representation of the sensed data the mobile surveillance appliance is configured to a generate a remote intervention request having encoded thereon the unique spatial location corresponding to the sensed data, wherein the remote intervention request include an event melioration corresponding to the event, and wherein the mobile surveillance appliance is capable of transmitting the remote intervention request.

23. The mobile surveillance system of claim 22, further comprising a remote intervener configured to receive the remote intervention request transmitted by the mobile surveillance appliance, wherein the remote intervener is configured to determine from the remote intervention request the unique spatial location corresponding to the event and the melioration of the event; and wherein the remote intervener is one of human agent remote intervener, a remote automated intervener, and a combination thereof.

24. The mobile surveillance system of claim 22, wherein the geographic coordinates are sent in a Session Initiation Protocol (SIP) INVITE message.

* * * * *